United States Patent [19]

King et al.

[11] 4,070,527

[45] Jan. 24, 1978

[54] EFFICIENT SODIUM/SULFUR BATTERY

[75] Inventors: Randall N. King, Johnston; Stephan P. Mitoff, Clifton Park; Manfred W. Breiter, Schenectady, all of N.Y.

[73] Assignee: Electric Power Research Institute, Inc., Palo Alto, Calif.

[21] Appl. No.: 714,064

[22] Filed: Aug. 13, 1976

[51] Int. Cl.² .......................................... H01M 10/39
[52] U.S. Cl. .................................... 429/104; 429/191
[58] Field of Search ................. 429/104, 31, 30, 101, 429/191

[56] References Cited

U.S. PATENT DOCUMENTS 3,826,685  7/1974  Dubin et al. .......................... 429/105
3,982,959  9/1976  Partridge et al. .................. 429/31 X Primary Examiner—Anthony Skapars
Attorney, Agent, or Firm—Townsend and Townsend

[57] ABSTRACT

Improved sodium-sulfur batteries are provided by enhancing the utilization of active positive-electrode material. In sodium-sulfur batteries, employing a liquid sodium electrode separated from a liquid sulfur electrode by a solid $\beta$-alumina electrolyte separator, where the sulfur is impregnated in an electronically conducting matrix such as porous carbon, enhanced utilization of active electrode material is achieved during the charging-discharging cycling by enhancing the electronic resistivity adjacent the $\beta$-alumina in the sulfur electrode. This can be achieved in a variety of ways, particularly employing porous carbon of higher resistivity adjacent the $\beta$-alumina as compared to the porous carbon distant from the $\beta$-alumina.

11 Claims, 2 Drawing Figures

EFFICIENT SODIUM/SULFUR BATTERY

This invention was made under contract with or supported by the Electric Power Research Insitute, Inc. of Palo Alto, California.

BACKGROUND OF THE INVENTION

1. Field of the Invention

Sodium-sulfur batteries are looked to as one possible solution to the storage of electrical energy for vehicular and electric utility application. The operating principles as well as the unique advantages of the sodium-sulfur-solid electrolyte battery have been discussed by Marcoux and Seo, "Sodium-Sulfur Batteries," Advan. Chem. Ser., No. 140, 216 (1975). The sodium-sulfur battery has a number of unique characteristics which distinguish the sodium-sulfur battery from other secondary batteries which are normally encountered. In the sodium-sulfur battery, the electrodes are liquids. The temperatures at which the sodium-sulfur battery is employed are above the melting points of sodium, sulfur and sodium polysulfide. The electrolyte is a solid, commonly $\beta$-alumina, which has mobile sodium cations. In addition, sulfur which forms the cathode is a non-conductor and, therefore, means must be provided for the transfer of electrons to and from the sulfur on charging and discharging. Finally, the initial product of the battery discharge is sodium pentasulfide ($Na_2S_5$) which is immiscible with sulfur, so as to create an inhomogeneous mixture, which is comprised of the ionically conducting sodium pentasulfide and the non-conducting sulfur. The sulfur can, therefore, interfere with the sodium transport and electron transfer. Upon further discharge reaction, the two-phase mixture of sodium pentasulfide and sulfur disappears to form a single phase with an average composition between sodium trisulfide ($Na_2S_3$) and sodium pentasulfide, depending upon the state of charge. When the battery is substantially charged, the two phase region is again formed. However, it has been found, in sodium-sulfur batteries employing a $\beta$-alumina electrolyte separator and porous carbon, as the electronic conductor for the sulfur, that upon repeated charging and discharging the capacity of the battery diminishes rapidly to a relatively low percentage of the initial capacity of the battery. Once the two phase region is reached during charging, further charging is only done with considerable difficulty. It has been concluded that the sulfur, being non-conductive, forms a blocking or insulating layer which prevents further reaction. This result is extremely undesirable, since it means that the theoretical capacity of the battery is lost and the system only partially employs the electrochemical energy available from the sodium and sulfur which is employed. In addition, partial blocking of the electrolyte causes localized high current densities at certain points within the cell. This, in turn, can cause cell failure and, therefore, limited life capability.

2. Brief Description of the Prior Art

In a National Science Foundation report, entitled "Research on Electrodes and Electrolyte for the Ford Sodium-Sulfur Battery," Steven A. Weiner, July 1975 (Contract No. NSF-C805) AER-73-07199, the problem of efficient recharing is discussed and a solution described based on the notion of enhanced convection of the reactants present in the sulfur electrode.

SUMMARY OF THE INVENTION

Increased utilization of active electrode material is achieved in sodium-sulfur solid-electrolyte batteries, having a conducting porous carbon in which substantially all of the sulfur is retained. The improvement comprises enhancing the resistivity of the sulfur electrode adjacent the solid electrolyte surface. Resistivity can be enhanced by employing a conducting porous carbon e.g. felt, of higher resistivity adjacent the solid electrolyte surface, as compared to the porous carbon employed distant from the solid electrolyte surface. By using this technique, greatly enhanced utilization of active electrode material is achieved, in that the battery can be recharged repeatedly to much higher percents of its theoretical capacity.

DESCRIPTION OF THE SPECIFIC EMBODIMENTS

Figure 1:
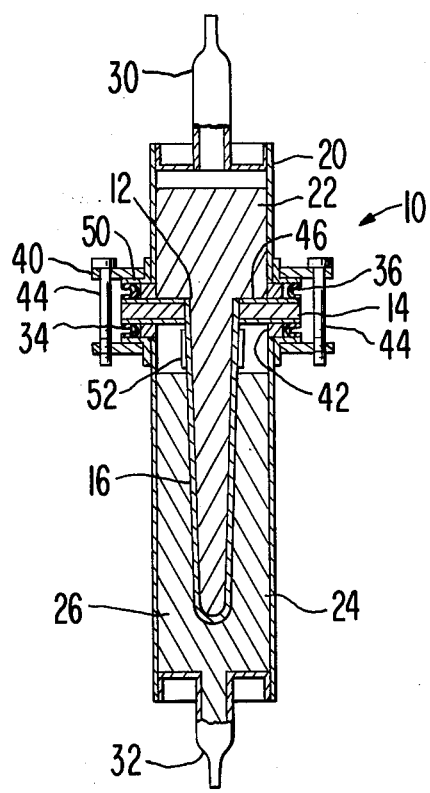
FIG. 1 is a cross-sectional elevation of a prototype sodium-sulfur battery.

Improved sodium-sulfur solid electrolyte batteries are provided, providing enhanced utilization of active electrode material during the discharging and charging cycling. The result is achieved by increasing the electronic resistivity of the sulfur electrode in the environment of the solid electrolyte separator surface, so that there is an electronic resistivity gradient which increases from a point distant from the separator surface, as one approaches the separator surface. The electronic resistivity gradient need not be uniform nor have a smooth relationship with the distance from the separator surface.

While it is not known for certain, it is believed that the reason that the efficiency of recharging drops is the adsorption of sulfur on to the solid electrolyte surface. Since sulfur is a non-conductor, the resistance at the surface is greatly enhanced. Furthermore, since the sulfur and sodium polysulfide are immiscible, the sulfur inhibits the approach of the sodium polysulfide to the solid electrolyte surface, inhibiting or diminishing the flow of sodium ions from the sulfur electrode into the electrolyte. It is believed that by enhancing the electronic resistivity of the sulfur electrode adjacent to the solid electrolyte surface, the amount of the sodium polysulfide at the electrolute surface which is oxidized to sulfur is diminished during the early stages of the recharging, so as to reduce the presence of sulfur at the solid electrolyte surface until a substantial proportion of the sodium polysulfide has been oxidized.

In considering the sodium-sulfur solid-electrolyte battery, the components are a sodium anode; a solid electrolyte separator, normally $\beta$-alumina; a sulfur cathode; and a conductor, generally porous carbon, in contact with the sulfur to provide for the transfer of electrons to and from the sulfur. The sulfur strongly adheres to the porous carbon, which is conveniently a felt of graphitized carbon fibers, with the porous carbon filling the entire area of the electrode.

In order to enhance the resistivity adjacent the solid electrolyte surface, a number of different techniques can be used, either individually or combined. The first technique is to use a porous carbon adjacent the solid electrolyte separator which is of higher resistivity than the porous carbon employed distant from the solid electrolyte separator. In this manner, the major proportion of the sulfur electrode is of relatively lower resistivity than the small portion of the electrode about the solid electrolyte surface.

Only a narrow band of the higher resistivity felt is required to reduce the amount of sulfur formed during the initial states of the charging. Primarily, the amount will be governed by mechanical convenience in introducing the layer of higher resistivity felt. In some instances there may be employed one or more layers of different resistivity felt, with the resistivity dropping as the distance from the $\beta$-alumina surface increases. Significantly, three or more layers may be employed, particularly where two or more layers of enhanced resistivity are employed to form a thin inner layer adjacent the $\beta$-alumina surface. The highest resistivity material being adjacent the $\beta$-alumina.

The region of higher resistivity will usually be at least about 0.25mm thick, more usually at least about 0.5mm thick, generally being not more than about 2.5mm thick and preferably being in the range of about 0.5 to 1.5 thick. The increase in resistivity will be at least 5% over the resistivity of the main body of felt, usually at least 10% and preferably at least 20% over the resistivity of the main body of felt. It should be understood that the increase in electronic resistivity should be the minimum amount required in conformance with achieving the desired results of the subject invention.

The manner in which porous carbon of different resistivity is employed will depend upon the nature and shape of the solid electrolyte. Where the solid electrolyte is a flat surface, porous carbon, e.g. felt, pads may be built up in layers from the surface. The porous carbon pad nearest the electrolyte surface will be of higher resistivity than the porous carbon pads which are distant from the surface. Where the electrolyte is shaped in the form of a tube, a solid sulfur plug may be formed from porous carbon and sulfur which may be then drilled to accomodate the electrolyte tube. The space for the tube will be made somewhat greater than the size of the tube, so that higher resistivity porous carbon may be introduced into the space. With fibrous material, preferably, the porous carbon is only lightly packed in the space, so as to further enhance the resistivity.

Various commerically available grades of porous carbon may be employed. For example, Thornel MAT VM-0031-0034 and graphite felt have been found useful.

By employing the techniques of the subject invention, cells having a sulfur-electrode depth of 0.7cm can be charged to greater than 75% of theoretical capacity at charging rates of 50 and 100mA/cm$^2$.

For further understanding of the subject invention, the drawings will now be considered. In FIG. 1, an exemplary electrolytic cell 10 of a sodium-sulfur battery is depicted. The cell has a glass seal 12 between the $\beta$-alumina ring 14 and the $\beta$-alumina tube 16. A mechanical seal holds the cell together. The upper can or sodium reservoir 20 is filled with sodium 22. In the lower can 24 is porous carbon plug 26 impregnated with sulfur. Ideally, the lower can should be both electronically conductive and corrosion resistant. While possible not being ultimately acceptable, stainless steel and coated aluminum have been used in laboratory cells.

The filling tubes 30 and 32 are crimped. Where precast plugs are employed for filling the sulfur compartment, the filling tube 32 for the sulfur compartment is not required.

Inconel O-rings 34 with C-shaped cross-section are compressed with the aid of the polished flanges 36 of the cans and the stainless steel collars 40. The O-rings are kept in place and protected from polysulfides in the sulfur compartment by the washers 42, made of aluminum for aluminum cans or stainless steel. A pressure of about 200 pounds is exerted onto the Inconel rings by bolting the collars 40 together with the screws 44. To achieve helium-leak tightness, thin washers 46 of aluminum foil must be inserted on the polished face of the $\alpha$-alumina ring 14. The collars 40 are insulated from the cans by the fiberglass tapes 46 and 50. A silica glass ring 52 holds the sulfur-impregnated porous carbon away from the seals and the upper portion of the $\beta$-alumina tube.

Because aluminum forms sulfide layers with poor conductivity when exposed to sulfur/polysulfide melts, the interior of the walls of the aluminum cans for the sulfur compartment were either coated with a refractory metal e.g. molybdenum or a carbon layer. The coatings provide electronic conductivity between the can and the porous carbon inside the sulfur compartment. The cells have an outer diameter of one inch; a $\beta$-electrolyte tube of about 1cm O.D. with about a 1mm wall thickness, and a length of a little less than about 7cm; a sulfur compartment having a depth of about 7cm and a volume to accomodate about 30.5g sulfur, and a sodium compartment having a volume for about 17.5 Ah of sodium.

The thickness of the higher electronic resistivity porous carbon between the $\beta$-alumina surface and the lower electronic resistivity porous carbon was about 1mm. The porous carbon was pushed into place under relatively mild pressure so as to provide a relatively loose packing.

Special molds, made of Teflon polymer serve for the preparation of the sulfur/porous carbon plug used for the sulfur electrode. The molds have a stainless steel rod, shaped like the $\beta$-alumina tube at their center. This rod is attached to the base which can be unscrewed from the tubular part of the mold. The mold is filled with suitable porous carbon to the required height. After keeping the mold and sulfur in a beaker inside an air furnace at about 130° C for about two hours, the liquid sulfur is poured into the mold. The mold is allowed to cool to room temperature in air. After cooling, the base of the mold is unscrewed. Usually, the sulfur/porous carbon plug adheres to the inner wall of the tubular part of the mold. It is subsequently removed from the tubular part with the aid of an hydraulic press.

Frequently, the sulfur/porous carbon plug requires machining to fit into the metal can of the sulfur compartment. The hole in the axis of the plug must match the outer diameter of the $\beta$-alumina, with additional space provided for higher resistivity porous carbon, when it is employed. After the sulfur/porous carbon plug has been machined to the correct size, it is put into the lower can and the quartz spacer added. The higher resistivity graphite is introduced into the extra space as appropriate, and the sodium filled half cell is inserted with its $\beta$-alumina tube into the hole of the plug. The half cell is firmly attached to the sulfur can by the mechanical seal described previously.

Using precast plugs of sulfur and carbon fiber, cells can be charged to greater than 75% of theoretical capacity at charging rates of 50 and 100mA per square centimeter by filling the space between the plug and $\beta$-alumina with Thornel MAT VM-0031. This material has a much higher electronic resistivity than MAT VM-0032, which was used for the rest of the plug. It was found that loose packing with the 0031 was better than tight packing.

A charge capability of 75% and 80% of theoretical was obtained at 100mA per square centimeter and at 50mA per square centimeter, respectively, by filling the space between the plug and the β-alumina tube with Thornel MAT VM-0034, while the plug employed MAT VM-0032, the matrix of which is of substantially lower electronic resistivity than a matrix of equivalent size of 0034. As indicated previously, loose packing was employed with the 0034.

Results were further enhanced when three graphite felts of different resistivity were employed. A first layer of VM 0031 was closest to the β-alumina, followed by an intermediate layer of VM 0034, with an outer and major layer of VM 0032. The combined thickness of the two inner layers was about 1mm. Excellent discharge and recharging was obtained employing both a stainless steel and an aluminum container.

Figure 2:
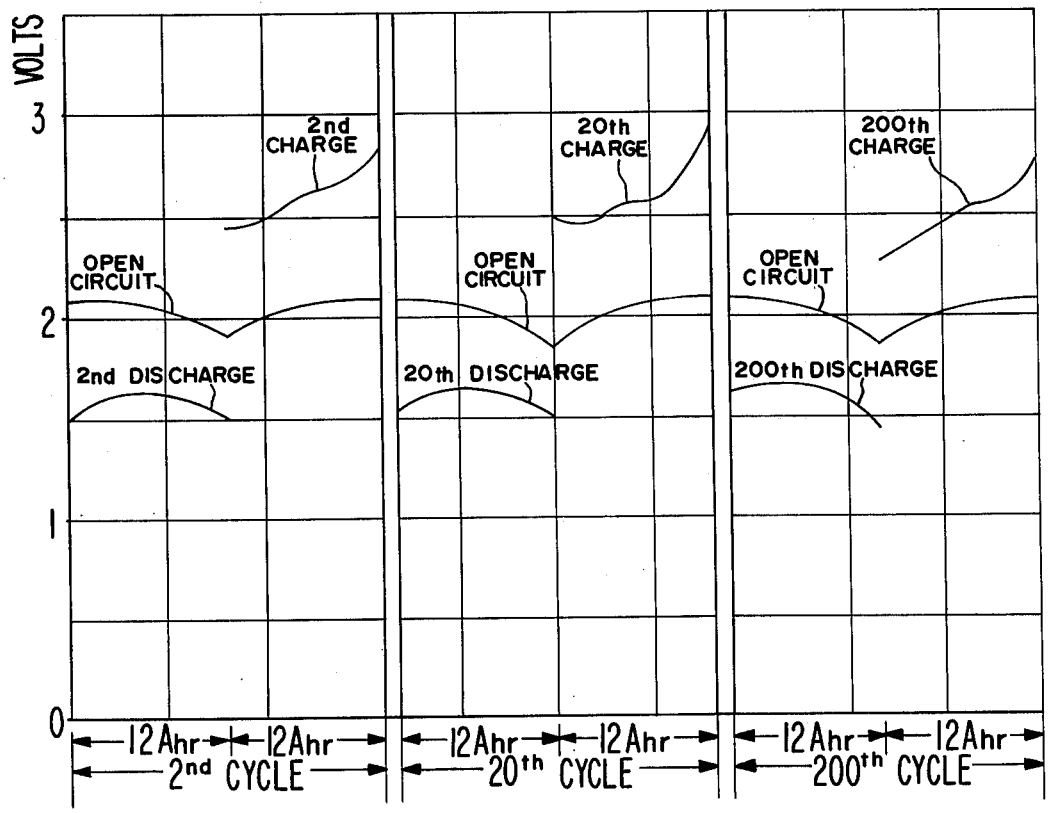
FIG. 2 is a graph of the cycling characteristics of a sodium-sulfur battery cell prepared in accordance with this invention.

FIG. 2 shows the result when a cell as described above was repeatedly recycled through charging and discharging.

As is evident from the above results, the subject invention provides a new way of enhancing the charging capability of sodium-sulfur solid- electrolyte batteries by enhancing the electronic resistivity in the sulfur cell adjacent the β-alumina surface. In this manner, more stored energy can be utilized for a relatively long period of time, enhancing the usefulness as well as lifetime of the battery.

Although the foregoing invention has been described in some detail by way of illustration and example for purposes of clarity of understanding, it will be obvious that certain changes and modifications may be practiced within the scope of the appended claims.

What is claimed:

1. In a sodium-sulfur solid-electrolyte battery having a sulfur electrode, wherein substantially all of the sulfur is impregnated in an electronically conducting matrix as the sulfur electrode and a solid-electrolyte, wherein said sulfur electrode is adjacent to said solid electrolyte, the improvement in combination therewith which comprises:

a sulfur electrode having an electronic resistivity gradient, the resistivity diminishing with distance from said solid electrolyte.

2. A sodium-sulfur solid-electrolyte battery, according to claim 1, wherein the electronic resistivity is enhanced by having porous carbon as the matrix and at least one thin layer of porous carbon adjacent the solid electrolyte surface of higher resistivity than the remaining porous carbon, with resistivity of the layers increasing toward said solid electrolyte surface.

3. A sodium-sulfur solid-electrolyte battery according to claim 2 wherein said porous carbon is graphitized carbon felt.

4. A sodium-sulfur solid-electrolyte battery according to claim 2, having at least three layers of porous carbon, the inner layers having a thickness in the range of about 0.25 to 2.5mm thick.

5. A sodium-sulfur solid-electrolyte battery, according to claim 4, wherein said thickness of said inner layers is in the range of about 0.5 to 1.5mm thick.

6. A sodium-sulfur solid-electrolyte battery, according to claim 2, wherein said solid electrolyte is β-alumina in the form of a tube.

7. A sodium-sulfur solid-electrolyte battery according to Claim 6, wherein said matrix is graphitized carbon felt.

8. In a sodium-sulfur β-alumina-solid-electrolyte separator battery having a sulfur electrode, wherein the sulfur is impregnated in porous carbon to form a sulfur electrode in electrical contact with a metal collector, and a β-alumina-solid-electrolyte, with said sulfur electrode adjacent to said solid-electrolyte the improvement in continuation therewith which comprises:

having at least one inner layer adjacent the surface of said β-alumina separator of higher electronic resistivity than the remainder of the porous carbon in the sulfur electrode, wherein the thickness of the inner layers is in the range of about 0.5 to 2mm.

9. A sodium-sulfur β-alumina-solid-electrolyte separator battery according to claim 8, wherein said porous carbon is graphitized carbon felt.

10. A sodium-sulfur β-alumina-solid-electrolyte separator battery according to claim 9, wherein there are at least two inner layers of increasing resistivity toward said β-alumina separator.

11. A sodium-sulfur solid-electrolyte battery according to claim 1 having a narrow band of higher resistivity adjacent to said electrolyte.

* * * * *